United States Patent [19]

Nemiroff et al.

[11] 4,406,543
[45] Sep. 27, 1983

[54] HIGH CONTRAST FLATNESS INTERFEROMETER

[75] Inventors: Michael H. Nemiroff, Del Mar, Calif.; Chris C. Bowman, Pittsburgh, Pa.

[73] Assignee: Burroughs Corporation, Detroit, Mich.

[21] Appl. No.: 284,366

[22] Filed: Jul. 17, 1981

Related U.S. Application Data

[63] Continuation-in-part of Ser. No. 69,739, Aug. 27, 1979, abandoned.

[51] Int. Cl.³ .................. G01B 11/14; G01B 11/30
[52] U.S. Cl. ................................. 356/359; 356/352; 356/371
[58] Field of Search ............... 356/359, 357, 371, 352

[56] References Cited

U.S. PATENT DOCUMENTS 3,891,320  6/1975  Kimura et al. ................. 356/359

OTHER PUBLICATIONS

Born et al., *Principles of Optics,* Fourth Edition, pp. 323–332, 1970.
Tolansky, S.; Multiple Beam Interferometry, Clarendon Press, Oxford 1958, pp. 8–19.
Twyman, F.; Prism and Lens Making, Hilger and Watts Ltd., 1952, pp. 390–393.
Herriott, D. R. "Multiple-Wavelength Multiple-Beam Interferometric Observation on Flat Surfaces", 51 JOSA10 pp. 1142–1145, Oct. 1961.

*Primary Examiner*—Bruce Y. Arnold
*Attorney, Agent, or Firm*—Charles J. Fassbender; J. Ronald Richbourg; Kevin R. Peterson

[57] ABSTRACT

Disclosed is an interferometer having an optical flat having a coated reference surface of aluminum whose thickness is in the range of 100–500 Å (preferably about 300 Å) covered with a coating of silicon dioxide of a thickness in the range of 1,000–10,000 Å (preferably about 3,000 Å). Such a coating on an optical flat when in engagement with a surface of an object to be tested greatly enhances the contrast of the interference fringes.

6 Claims, 5 Drawing Figures

HIGH CONTRAST FLATNESS INTERFEROMETER

BACKGROUND OF THE INVENTION

This is a continuation in part of Ser. No. 069,739 filed Aug. 27, 1979 now abandoned.

This invention relates, in general, to interferometers and, more particularly, to an improved interferometer which produces high contrast interference fringes when measuring the flatness and topography of a test surface, such as the surface of substrates for use in the manufacture of bubble memories.

In many fields of technology it is desirable to test semi-manufactured products, such as substrates in bubble memory technology, for surface flatness and topography and, to this end, it is desirable also to determine at a glance whether the flatness and topography of the tested surface is within a permissible tolerance range.

Instruments, used in such a determination, and using the interference of light between the test surface and an optical flat are called interferometers. An optical flat is a disk having a surface of extreme flatness, considered a reference standard, and the object to be tested is conventionally placed directly on this reference surface so that light, when directed through the optical flat and the test object, will produce interference fringes which are a measure of the flatness and topography of the test surface.

The problem with conventional interferometers is that the interference fringes are not sufficiently sharp nor of a sufficient contrast to the background light so as to be visible for photography or for viewing the same on a television screen.

Accordingly, it is an object of this invention to provide an interferometer which will produce high contrast interference fringes.

SUMMARY OF THE INVENTION

The invention which attains the foregoing object is an optical interferometer including a light source and an optical flat whose reference surface has a coating comprising an aluminum layer covered by a second layer of silicon dioxide to protect the soft aluminum layer. When both the optical flat and the object are subject to monochromatic light, a high contrast fringe pattern is produced.

ADDITIONAL BACKGROUND MATERIAL

There are, of course, in the prior art a number of patents to interferometers and a number of patents showing the coating of optical surfaces. Typical examples of interferometers are disclosed in U.S. Pat. Nos. to Wilczynski et al No. 3,359,852; to Jaerisch et al No. 3,858,981; and to Kimura et al No. 3,891,320. Examples of coatings on optical surfaces are shown in the U.S. Pat. Nos. to Gelber No. 3,070,097; to Thelen No. 3,914,023; to Apfel et al No. 3,649,359 and to Negishi et al No. 4,004,851. Furthermore, the patent to Dobler et al U.S. Pat. No. 3,984,581 shows a method of applying reflection coatings on optical elements. However, the coatings used in the foregoing prior art are for antireflection purposes and none teaches the use of a coating of or an optical flat on an interferometer to provide high contrast interference fringes for interferometer measurements.

BRIEF DESCRIPTION OF THE PREFERRED EMBODIMENT

Figure 1:
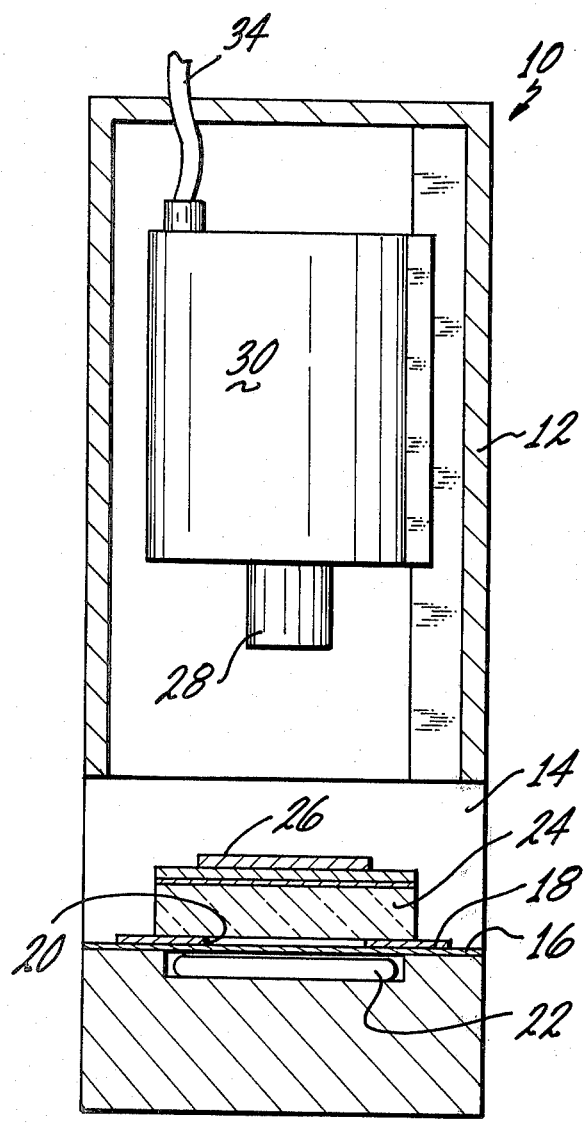
FIG. 1 is an enlarged elevational view of the interferometer of the invention, partly in section, illustrating the optical flat and substrate in position between a light source and a closed circuit TV monitor.
Figure 2:
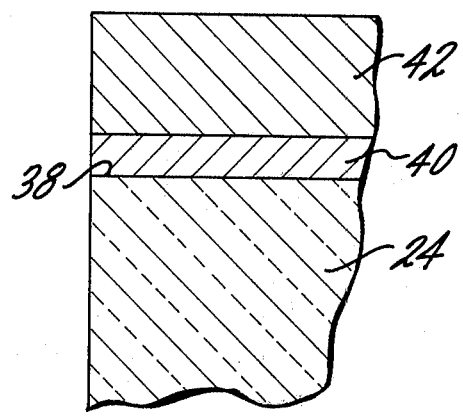
FIG. 2 is a partial showing of a part of the optical flat of FIG. 1 enlarged to show the coating on the reference surface thereof.
Figure 3:
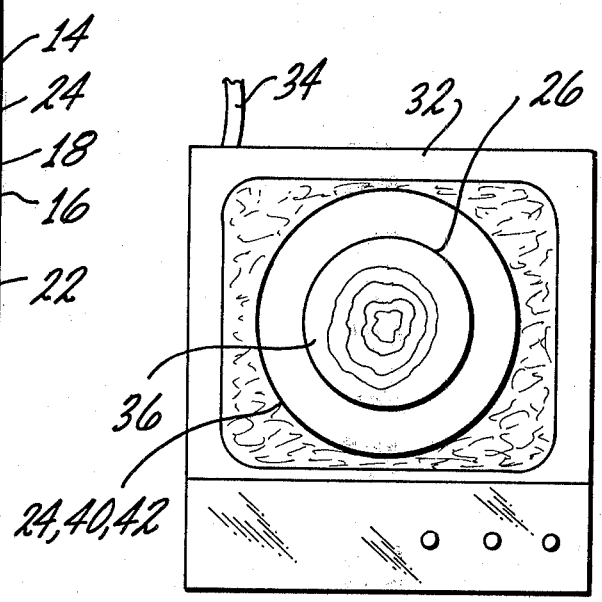
FIG. 3 shows the interference fringe pattern on a closed circuit TV monitor screen.

Turning now to the drawings, there is shown an optical interferometer 10 of this invention including an opaque enclosure 12 with a front opening 14 for operator access and which contains a transparent light diffusing plate 16 supporting a mask 18 having an opening 20 to mask the light from monochromatic light source 22 (preferably He plasma) below the mask. Light from the light source is directed through an optical flat 24 disposed on top of the mask.

In the embodiment illustrated, a transparent substrate 26, preferably one used in the manufacture of chips (typically Gadolinium Gallium Garnet) for magnetic memories, is placed on the optical flat so that light from the light source is directed through the optical flat and through the transparent substrate and infringes on the lens 28 of a closed circuit TV camera 30. The closed circuit TV camera 30 is connected to a receiver 32 via cable 34 whose CRT will show an interference pattern 36 according to the flatness and topography of the substrate.

As hereinabove mentioned, heretofore the light, (whatever the source) was normally directed through an optical flat such as 24 and through the substrate in an interferometer, but was insufficient to provide high enough contrast to be discernible by a viewer or to be monitored by a TV camera. In order to improve the prior art interferometer and to accomplish a high contrast of the interference fringe patterns, the reference surface 38 of the optical flat is first coated with aluminum, shown as 40, the thickness of which is in the range of 100–500 Å, and a coating 42 of silicon dioxide the thickness of which is in the range of 1,000–10,000 Å. Preferably, the aluminum coating is about 300 Å and the silicon dioxide coating is about 3,000 Å.

Figure 4:
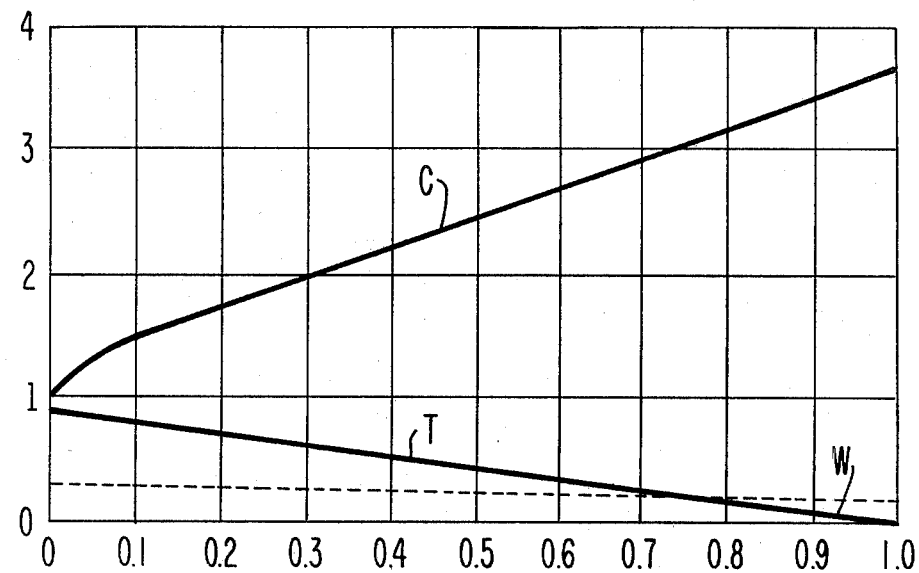
FIG. 4 is a set of curves illustrating the operation of the interferometer of FIG. 1.

Reference should now be made to FIG. 4 wherein a set of curves C, T, and W show the improved flatness measuring capability which is obtained by the above-described inteferometer. Curve C gives contrast ratio; curve W gives fringe half-width ratio; and curve T gives first order of transmission through the test and reference surfaces.

All of these curves C, W, and T are for the condition where the reflectivity of the test surface is 0.1. That is the nominal reflectivity of a $G^3$ substrate; as that substrate's reflectivity generally lies within 0.05–0.15. By comparison, the variable $R_1$ on the horizontal axis is the reflectivity of the interferometer's reference surface.

Curves C, W, and T in FIG. 4 were obtained by a computer plot of mathematical equations for those variables. Those equations are as follows:

$$C = \left( \frac{1 + \sqrt{0.1 R_1}}{1 - \sqrt{0.1 R_1}} \right)^2 \quad \text{equation 1}$$

$$W = \frac{1 - \sqrt{0.1 R_1}}{\pi} \quad \text{equation 2}$$

$$T = -0.9 R_1 + 0.9 \quad \text{equation 3}$$

Contrast C as expressed above is the ratio of maximum intensity to minimum intensity of all light which passes through the surfaces. This is an important factor in the human discrimination of visual images, because the retina of the eye generates two signals along the optic nerve to the brain, one of which indicates light intensity changes. See *Physiology of the Human Body*, Fifth Edition, page 360, by Arthur C. Guyton, M.D.

By comparison, T is the reference surface transmission times the test surface transmission. This product gives the most significant component of light intensity that passes through the two surfaces. Of course, additional components of the light will emerge due to the reflectivity of the two surfaces. But those components are substantially smaller in magnitude than the above product; so they can be ignored in determining general level of light intensity. And, general level of light intensity is another important factor in the human discrimination of visual images because as stated in the above physiology reference at page 360, the other signal transmitted along the optic nerve to the brain indicates the general level of light intensity.

W, the fringe half-width ratio, is that portion of the fringe in which light intensity is at least one-half of the maximum light intensity, divided by the distance between adjacent fringes. This parameter is important because a very small W means that the fringe width is very sharp; and thus no information can be obtained from the interference pattern about the test surface in the large area between the fringes. This problem is addressed in a publication, "Multi-Wavelength Multiple-Beam Interferometric Observation of Flat Surfaces", *Journal of the Optical Society of America*, Volume 51, Number 10, October, 1961, by D. R. Herriott. But multi-wavelength interferometers are complicated and expensive due to the need for a multi-wavelength generating light source.

In the present invention, the light source is monochromatic, and the reflectivity $R_1$ of the reference surface is chosen to be between 0.30 and 0.95. This insures that the contrast ratio and general level of intensity are sufficiently high for human perception, and that the fringe width W is broad enough to give information about the surface between fringe peaks.

By comparison, prior to this invention, $G^3$ substrates were analyzed in interferometers whose reference surface was made of glass. But glass has a characteristic reflectivity of about 0.04. And by inspection of FIG. 4, it can be seen that when $R_1$ equals 0.04, the contrast ratio C is only about 1.3. But by increasing $R_1$ to at least 0.3, the contrast ratio increases to 2.0. And this is an improvement of over 300% in the contrast ratio of 1.3, because a contrast ratio of 1.0 is no contrast at all. This improvement is evident by inspection of two photographs which were submitted in an amendment as FIGS. A and B on Jan. 6, 1981 in the parent case.

Also in the prior art, inteferometers have been described wherein both the reference surface and the test surface are coated with a thin film of silver. See, for example, the publication *Multiple Beam Interferometry*, S. Tolansky, Clarendon Press, Oxford, England, 1948, pp. 10 and 11. That interferometer is known as the Fabry-Perot interferometer.

But in testing the surface flatness of a $G^3$ substrate, the Fabry-Perot interferometer has several deficiencies. One of these deficiencies is that a thin film of silver must be deposited on the $G^3$ substrate before it can be tested. But as a practical matter, it is impossible to deposit any film with absolute uniformity on a substrate. So, since the $G^3$ substrate by itself is essentially transparent and since the high reflectivity of a silvered $G^3$ substrate is due almost entirely to the silvered film, the reflectivity of a silvered $G^3$ substrate is not constant. Instead, it varies across the silvered surface with the thickness of the silver film.

Figure 5:
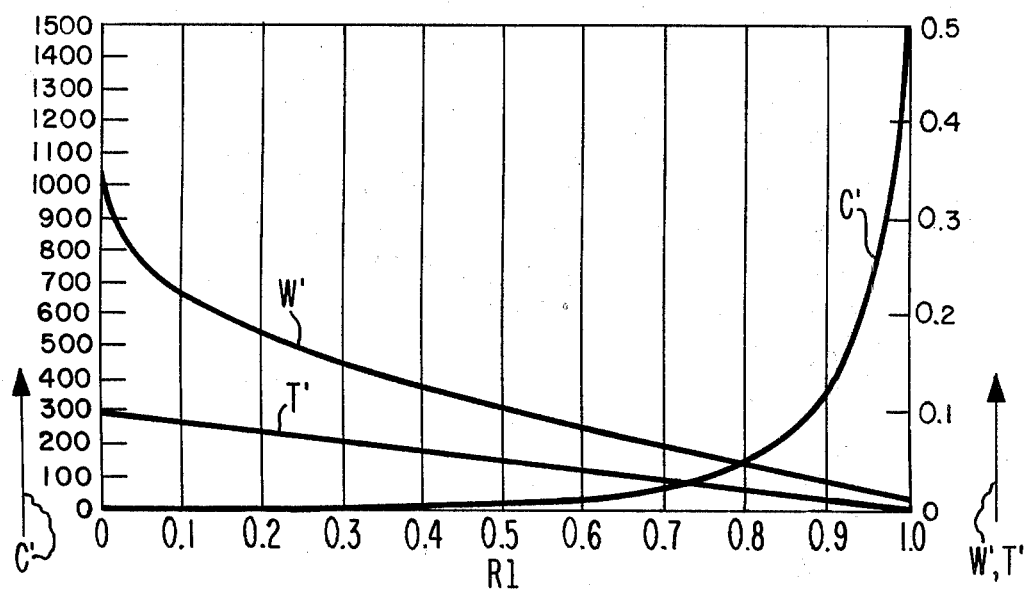
FIG. 5 is a set of curves illustrating the operation of a prior art Fabry-Perot interferometer for comparison purposes.

FIG. 5 is a set of curves which illustrate the consequences of this varying reflectivity. There, curves $C'$, $W'$, and $T'$ respectively are plots of equations 1, 2, and 3 with the factor of 0.1 being replaced by 0.9 and vice versa. With those changes, equations 1-3 apply to an interferometer having a reference surface reflectivity of 0.9, and having a varying test surface reflectivity of $R_1$.

Ideally, in a Fabry-Perot interferometer, the reflectivity of the test surface is quite high. For example, page 13 of the above-cited Tolansky publication lists values for R ranging from 0.7 to 0.94, where R is the square root of the reference surface reflectivity times the square root of the test surface reflectivity. But inspection of FIG. 5 shows when $\sqrt{0.9 R_1}$ is greater than 0.7, the contrast ratio C varies drastically with $R_1$. Thus, the contrast ratio is very non-uniform in the interference pattern produced by a silvered $G^3$ substrate.

Further, as can be seen from FIG. 5, the fringe half-width ratio W is extremely small when $\sqrt{0.9 R_1}$ is greater than 0.7. Consequently, no information can be obtained from the resulting interference pattern about the surface topography of the $G^3$ substrate between the fringes. This is the problem that is addressed in the above-cited D. R. Herriott publication.

In addition, the first order of transmission T through the reference and test surfaces is extremely small when $\sqrt{0.9 R_1}$ is greater than 0.7. Thus, a very high intensity light source is needed to get an interference pattern whose general intensity matches that produced by the claimed invention. However, such a high intensity light source also produces a high amount of heat; and that in turn requires additional cooling means. Otherwise, the $G^3$ substrate can become so hot that it will warp. Further, high intensity monochromatic light sources are more expensive than those of lower intensity.

Then, after testing of a silvered $G^3$ substrate is complete, the silvered layer must be removed. That is, the $G^3$ substrate clearly cannot be used in a bubble memory system with the silvered layer remaining intact. But this removal process is very delicate and can alter the substrate's surface after it has been tested. Further, this removal, as well as the initial deposition process, adds to the cost and time of the fabrication process for a bubble memory.

One preferred embodiment of an interferometer constructed according to the invention, plus its advantages over prior art interferometers, has now been described in detail. In addition, however, many modifications and changes can be made to these details without departing from the nature and spirit of the invention. Accordingly, it is to be understood that the invention is not limited to said details but is defined by the appended claims.

What is claimed is:

1. An optical interferometer for indicating the flatness of a highly transmissive and relatively unflat test surface having a reflectivity of only 0.05–0.15, said interferometer comprising:

a monochromatic light source;

a single optical flat having a relatively flat reference surface;

means for directing light from said light source through said reference surface and then through said test surface when said surfaces contact each other except for slight spaces that occur due to the unflatness of said test surface to produce an interference pattern;

said reference surface having a reflectivity for said light within the range of 0.30–0.95 to thereby produce said interference pattern with a contrast ratio of at least 2.0, a first order of transmission through said test surface and reference surface of at least 0.05, and a nearly constant fringe half-width ratio of at least 0.2.

2. An optical inteferometer according to claim 1 wherein a thin layer of reflective material covers said reference surface but not said test surface.

3. An optical interferometer according to claim 2 wherein said reflective material is 100 Å–500 Å in thickness and is aluminum.

4. An optical interferometer according to claim 1 wherein a thin layer of transparent material covers said reference surface.

5. An optical interferometer according to claim 4 wherein said transparent material is 1,000 Å–10,000 Å in thickness and is silicon dioxide.

6. An optical interferometer according to claim 1 wherein said light is directed perpendicular to said surfaces by said means for directing.

* * * * *